United States Patent [19]
Lau et al.

[11] Patent Number: 5,892,510
[45] Date of Patent: Apr. 6, 1999

[54] FIELD OBJECTS AND A METHOD FOR DEVELOPING A GRAPHICAL USER INTERFACE CONTAINING THE FIELD OBJECTS

[75] Inventors: Frankie Lau, Pleasanton; Bangalore Madhuchandra, Milpitas; Nagendra Nagarajayya, Sunnyvale; Nandita Gupta, Santa Clara; Theresa Brown, Milpitas; Leland Chen, Fremont; Sarma Subba Rama Ballamudi, Milpitas; Ashok Gourishetty, Fremont, all of Calif.

[73] Assignee: Sun Microsystems, Inc., Mountain View, Calif.

[21] Appl. No.: 673,860

[22] Filed: Jul. 2, 1996

[51] Int. Cl.⁶ .................................................. G06F 7/00
[52] U.S. Cl. .......................... 345/333; 345/339; 345/968
[58] Field of Search ..................................... 395/333, 335, 395/339, 346, 347, 356, 603, 604, 607, 614, 968; 345/333, 335, 339, 356, 968

[56] References Cited

U.S. PATENT DOCUMENTS

| | | | |
|---|---|---|---|
| 5,228,123 | 7/1993 | Heckel | 395/333 |
| 5,495,567 | 2/1996 | Iizawa et al. | 395/968 |
| 5,572,650 | 11/1996 | Antis et al. | 395/356 |
| 5,581,758 | 12/1996 | Burnett et al. | 395/335 |

OTHER PUBLICATIONS

Lippman, Stanley B., "C++ Primer", Second Edition, AT&T Bell Laboratories, 1991.

*Primary Examiner*—Raymond J. Bayerl
*Assistant Examiner*—Cao H. Nguyen
*Attorney, Agent, or Firm*—Skjerven, Morrill, MacPherson, Franklin & Friel LLP; Omkar K. Suryadevara

[57] ABSTRACT

A graphical user interface (GUI) application program has one or more screens and a number of objects hereinafter "field objects", each field object being uniquely associated with a single field in a screen. Each field object contains storage elements that hold data displayed in a screen's field. Each field object also contains storage elements that indicate functions that can be performed on data held in the field object. The field object may have at least three data member storage elements, one for holding data, another for holding a label, and yet another for holding a search operator. The GUI application program also includes field map storage elements, each of which maps a field in a screen to a corresponding column in the database, thereby allowing database queries to be created and performed dynamically on user entered field information. Such field map storage elements allow a database to be changed without affecting various parts, e.g. field objects and screen functions, of the GUI application program.

3 Claims, 10 Drawing Sheets

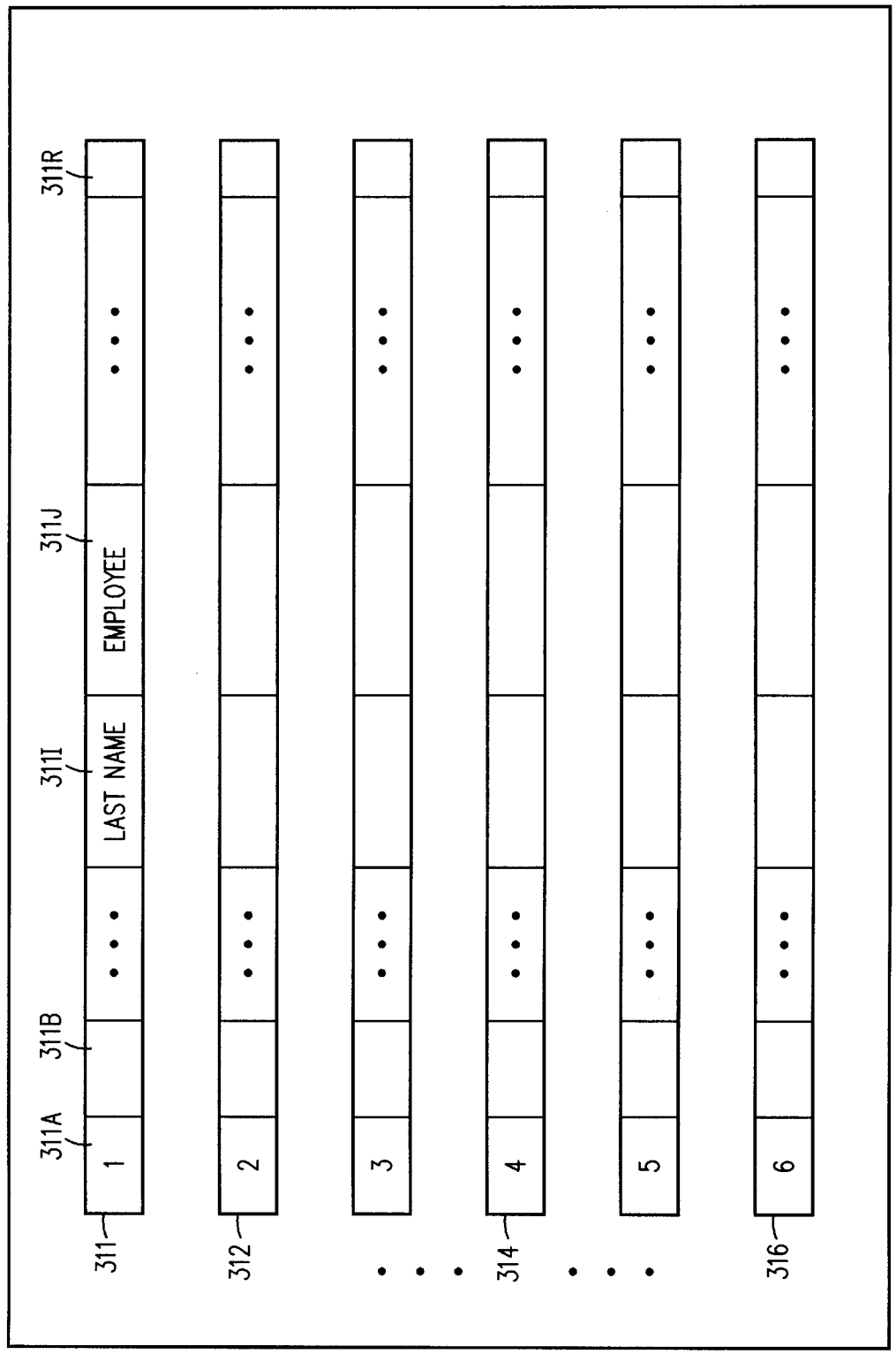
FIG. 3A1

FIELD OBJECTS AND A METHOD FOR DEVELOPING A GRAPHICAL USER INTERFACE CONTAINING THE FIELD OBJECTS

FIELD OF THE INVENTION

One embodiment of the invention relates generally to a graphical user interface application program for storing and retrieving information from a database in a computer's memory, and more specifically to a structure and method for facilitating development of graphical user interfaces for databases.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

A conventional computer system 110 (FIG. 1) includes a central processing unit (CPU) 111, a monitor 112, a keyboard 113, a mouse 114 and a main memory 115. CPU 111 executes instructions of a computer application program (hereinafter "frontend application") 116 resident in main memory 115 to control screens, e.g. screen 117, displayed on monitor 12. Screen 117 has a number of fields, e.g. fields 118A–118N (where N is the number of fields in screen 117) that display information identified by labels 119A–119N. The information displayed in screen 117 is typically received from or transferred to a server 120 that runs a backend application 121 that uses a database stored in hard disk 122.

Fields 118A–118N in screen 117 typically include a scroll list 118N for displaying a limited amount of information from data base 122, e.g. rows ROW1, ROW2 and ROW3 of text respectively indicating each employee's first name, last name, and department. In this example, scroll list 118N does not display other information, e.g. each employee's date of birth, and salary. To view such information, the user selects, e.g. clicks on mouse 114 to select one of rows ROW1–ROW3 in scroll list 118N. Based on an employee's identification number, all information for a selected employee is filled in fields 11BA–118N-1 of screen 17. Thereafter, a user can modify information in fields 118A–118N-1 and update the selected employee's information in database 122. Alternatively the user can add the modified information as a new record to database 122.

The above-described frontend application 116 is a typical graphical user interface (GUI) application program that includes a number of screens (not shown) that must be painstakingly developed. For example, to develop a field 118A, a computer application developer first draws a rectangle as the outer boundary of field 118A. Then the developer draws a label 119A carefully, making sure that label 119A is in line with the drawn rectangle. In this approach, each of labels 119A–119N and the corresponding field 118A–118N are independent of each other except for physical proximity on screen 117. Therefore, if a field 118I is changed in size or position, the corresponding label 119I must also be changed in size or position to restore alignment.

Frontend application 116 includes instructions for each field 118I, to validate the information input by the user, and instructions to perform searches in database 122, for example, for all employee records that match a user-entered "last name" in field 118A. Specifically, frontend application 116 includes one or more predetermined database queries (e.g. in a structured query language SQL) to perform database searches using information retrieved from screen 117. The predetermined database queries are typically interspersed between instructions for controlling display of screen 117. Therefore, changing from one database to another requires considerable effort to replace all the predetermined database queries. Moreover, the database queries being predetermined limit the types of searches a user can perform.

Frontend application 116 also manages the temporary storage of data retrieved from database 122 and displayed in scroll list 118N. Management of such temporary storage by frontend application 16 can become a big chore if such software must be written independently for every screen.

So, developing, testing and maintaining a large frontend application with forty to fifty such screens, each screen having ten to twenty such fields becomes an unmanageable task, involving development of each field in each screen, coding of instructions for screen display, storage management and predetermined database queries, all of which are typically integrated together.

Object-oriented languages, such as C++ and SmallTalk allow packaging of data structures and functions together into "classes" that can be instantiated to form "objects." Multiple objects "inherit" data structures and functions from a common class. See "C++ Primer," 2nd Edition, Stanley B. Lippman, Addison-Wesley Publishing Company, Reading, Mass., 1991, that is incorporated by reference herein in its entirety.

UIM/X, a Motif based GUI builder made by Visual Edge Software, Ltd. and available from Black and White Software, Inc. 2155 So. Bascom Ave., Suite 210, Campbell, Calif. 95008, allows use of such objects, called "components" in UIM/X. UIM/X components allow functions to be reused and can simplify the above described unmanageable task. However, a developer must still develop, e.g. validation software to validate data entered by a user, and the predetermined queries of the type discussed above.

SUMMARY OF THE INVENTION

One embodiment of a computer process of this invention eliminates the prior art problems associated with generating a graphical user interface for a computer application that required a large number of screens with each screen including a number of fields. The computer process uses one or more novel objects, hereinafter "field objects" each of which is associated with a field in a screen, and each of which is devoid of any information related to a backend application, such as a database. Such field objects can be formed, for example, by instantiation of one or more predetermined classes.

In addition to the field objects, the computer process also uses a set of novel field map storage elements that map a field object to predetermined locations, e.g. to a column in a database. The field map storage elements allow a database query to be built dynamically by a set of common database functions. Such dynamic query building eliminates the prior art tedious process of hardcoding database queries for each search criteria, and for each screen. Therefore, a user can issue database queries through just manipulation of fields on a screen, without knowing, for example, a structured query language (SQL).

Moreover, any changes to a database do not affect the field objects. Furthermore, as each of the field objects inherits various properties from the predetermined class, less development effort and coordination between developers is necessary as compared to the prior art. Use of objects also allows easy extension of the computer process by just changing the predetermined class. Moreover, use of objects provides the same "look and feel" in all screens, without the need for coordination between multiple developers.

A computer process embodiment can be implemented using a GUI builder, such as Motif based UIM/X, to instantiate the above-described field objects. A developer skilled in the art of GUI application program development can obtain a screen, for example by instantiation of a predetermined "screen" class. Next, the developer assigns a number of screen specific functions, one for each screen.

The developer selects and instantiates, from a group of predetermined classes, one or more field objects. As the field objects are devoid of information related to a database, during the instantiation step the developer does not enter any database information. Instead, the developer typically enters only the information related to a field, e.g. a label for identifying the information to be displayed in the field, and an identification number to be used in identifying the field object as described below. The developer generates source code, e.g. through UIM/X.

Next, the developer stores, in a number of storage elements, a mapping of the fields in the screen to fields in a database, e.g. stores the identification number of each field object and corresponding column and table names of a database. The developer appends the addresses of these field mapping storage elements to the generated source code. Finally, the developer also adds custom instructions, for example, instructions for screen functions to perform custom operations, e.g. checking a user's privilege, and for database functions to add custom conditions to a database query.

Thereafter, the developer compiles the source code to generate an executable computer application program containing screen(s), field objects, screen functions, field map storage element addresses and the back-end interface functions, stores the executable application program in a computer's memory, and changes the state of the computer's central processing unit by executing the executable computer application program, thereby to impart GUI functionality to the computer.

BRIEF DESCRIPTION OF THE DRAWINGS

FIG. 3A1 illustrates initialization of a field map storage element in one embodiment of the invention.

DETAILED DESCRIPTION

One embodiment of a computer process of this invention eliminates the prior art problems associated with generating a graphical user interface for a computer application that required a large number of screens with each screen, including a number of fields. The computer process uses one or more novel objects, hereinafter "field objects", each of which is associated with a field in a screen, and each of which is devoid of any database information such as a table name or a column name. In addition to the field objects, the computer process also uses a set of novel field map storage elements that map a field object to predetermined locations, e.g. to a column in a database. The field map storage elements allow a database query to be built dynamically by a set of common database functions that are shared by all screens in the computer process.

Numerous advantages arise from such separation of screen related information, such as field objects, from database related information, such as the query building database functions in a computer process. Holding only screen information insulates the field objects from any changes to a backend application, such as a database. Moreover, the field map storage elements allow a database query to be built dynamically by a set of common database functions, thereby eliminating the tedious prior art process of hardcoding one or more queries for each search criteria, and for each screen.

In the following description, references are made to, e.g. a monitor, a keyboard and a mouse to illustrate the invention. It will be obvious, however, to a person of ordinary skill in the art of designing GUI application programs that these devices are merely illustrative and not limiting.

Moreover, in the following description, prior art parts of computer systems, such as a database or a GUI builder, are not described in detail so as not to unnecessarily obscure or burden the description of the present invention. The embodiments of the present invention described below are provided in software that executes as a computer process. However, according to the principles of the present invention illustrated below, hardware embodiments of the present invention are also feasible.

In one embodiment of a method 250 (FIG. 2B), a developer skilled in the art of GUI application program development obtains in step 251 a screen 210 (FIG. 2A) having a number of command items 211A, 211B . . . 211N, e.g. a "find" button, a "clear" button, an "add" button, an "update" button and a "delete" button. The developer can obtain screen 210, for example by instantiation of a predetermined "screen" class 200.

Figure 2A:
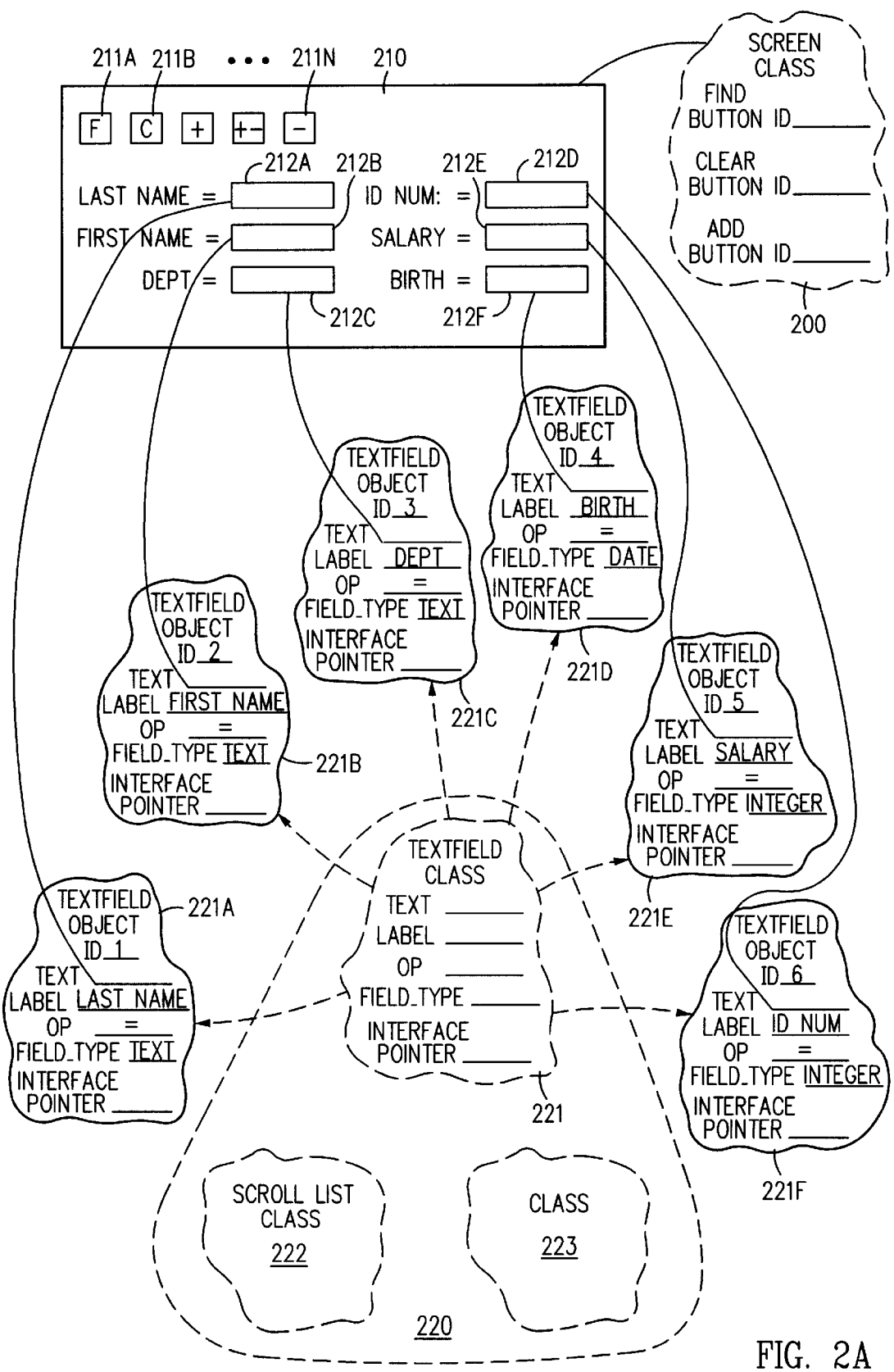
FIG. 2A illustrates instantiation of a number of objects from a predetermined class in one embodiment of the invention.
Figure 2B:
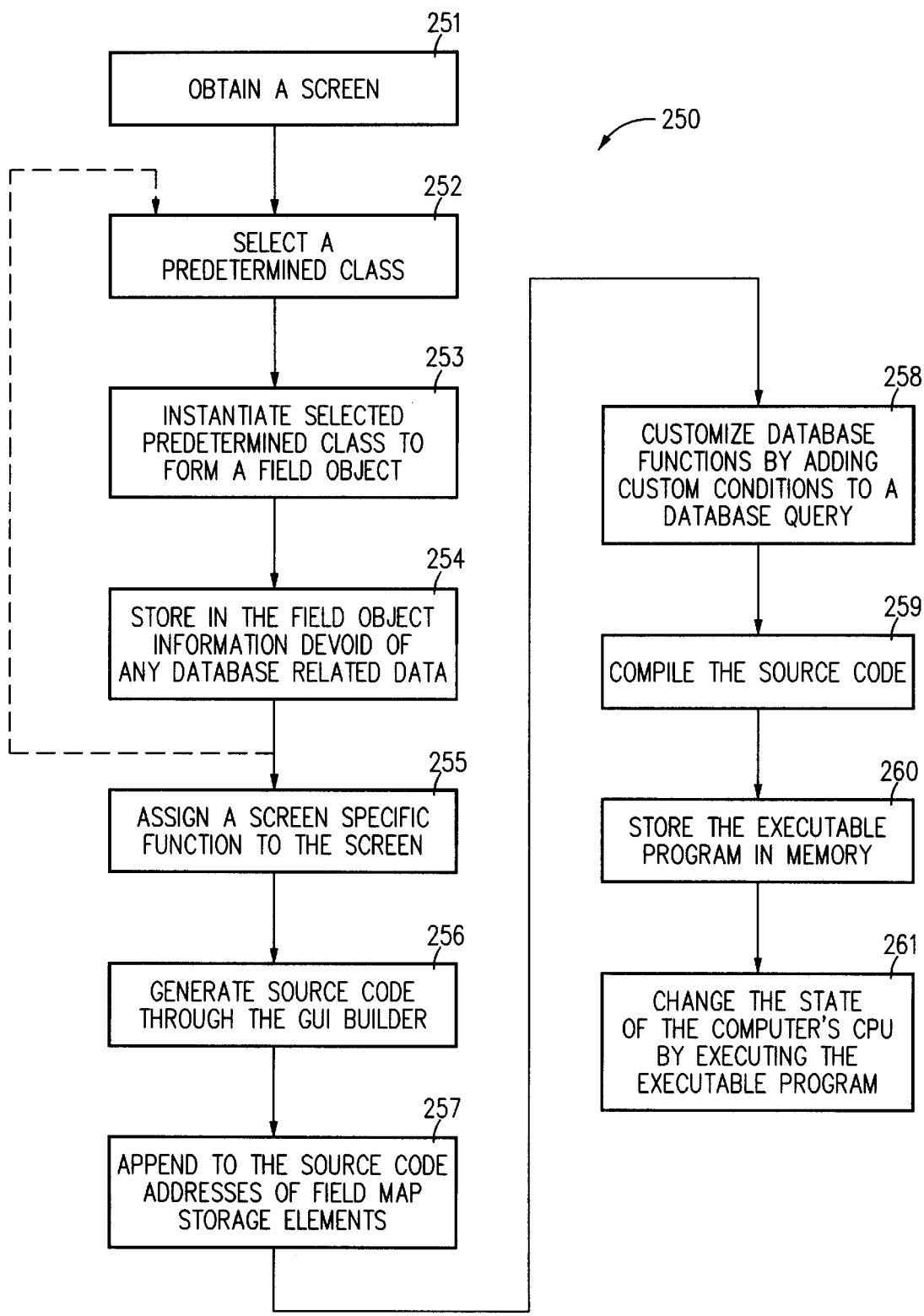
FIG. 2B illustrates steps of a method of developing a graphical user interface containing the field objects of FIG. 2A.

Thereafter, in step 252 (FIG. 2B) the developer selects from a group 220 (FIG. 2A) of predetermined classes 221–223 a single predetermined class, e.g. class 221. In step 253 (FIG. 2B) the developer instantiates class 221 to form a field object, e.g. field object 221A (FIG. 2A). During the instantiation step 253, the developer assigns an identification number that is stored in storage element ID of the instantiated field object 221A, and keeps note of the assigned identification number, e.g. number 1 for field object 221A. The identification number noted by the application developer is used later in the field map storage elements described below. Field object 221A in one embodiment has storage elements listed in Table 1 (below) and member functions listed in Table 2 (below).

After the instantiation step, in a step 254 (FIG. 2B) the developer stores only information related to a field, e.g. field 212A in field object 221A. For example, when a developer stores the text "LAST NAME" in data member storage element LABEL of text field object 221A, field 212A is thereafter automatically labelled with the label "LAST NAME". Furthermore, in this embodiment, the label "LAST NAME" is automatically aligned in line with a rectangular field for display of information from data member storage element TEXT in field 212A.

Inclusion of data member storage element LABEL and data member storage element TEXT in the same object therefore allows automatic alignment of information from these storage elements and eliminates the prior art need for physically aligning a label of a field. That is, if field 212A is changed in size or position, the label "LAST NAME" is also automatically changed in a similar manner by the member functions of field object 221A.

Also similarly, when the developer stores an operator "=" in data member storage element OP, then the operator "=" is automatically displayed in line between label "LAST NAME" and field 212A. Thereafter, the member functions of field object 221A automatically maintain the alignment and relative positions of the displayed information from data member storage elements LABEL, OP and TEXT (in that order in this embodiment).

Also in step 254 (FIG. 2B), the developer stores in a data member storage element FIELD_TYPE the type of information expected to be stored in data member storage element TEXT. For example, the developer stores type TEXT for text information (e.g. for fields 212A–212C), type INTGER if the information is a number (e.g. for fields 212D and 212E), and type DATE if the information is a date (e.g. for field 212F). Note that in store step 254, the developer deliberately does not store any database access information into field object 221A. That is, field object 221A does not hold any information needed to access the database, such as a table name or a column name. Instead, such information is held in one or more field map storage elements as discussed below.

The application developer repeats steps 252–254 as often as necessary to instantiate other field objects, e.g. objects 221B–221F by use of classes 221–223 in group 220. In step 255 the developer assigns several screen specific functions 422A–422M (FIG. 4; described more completely below), one for each screen being developed.

Figure 1:
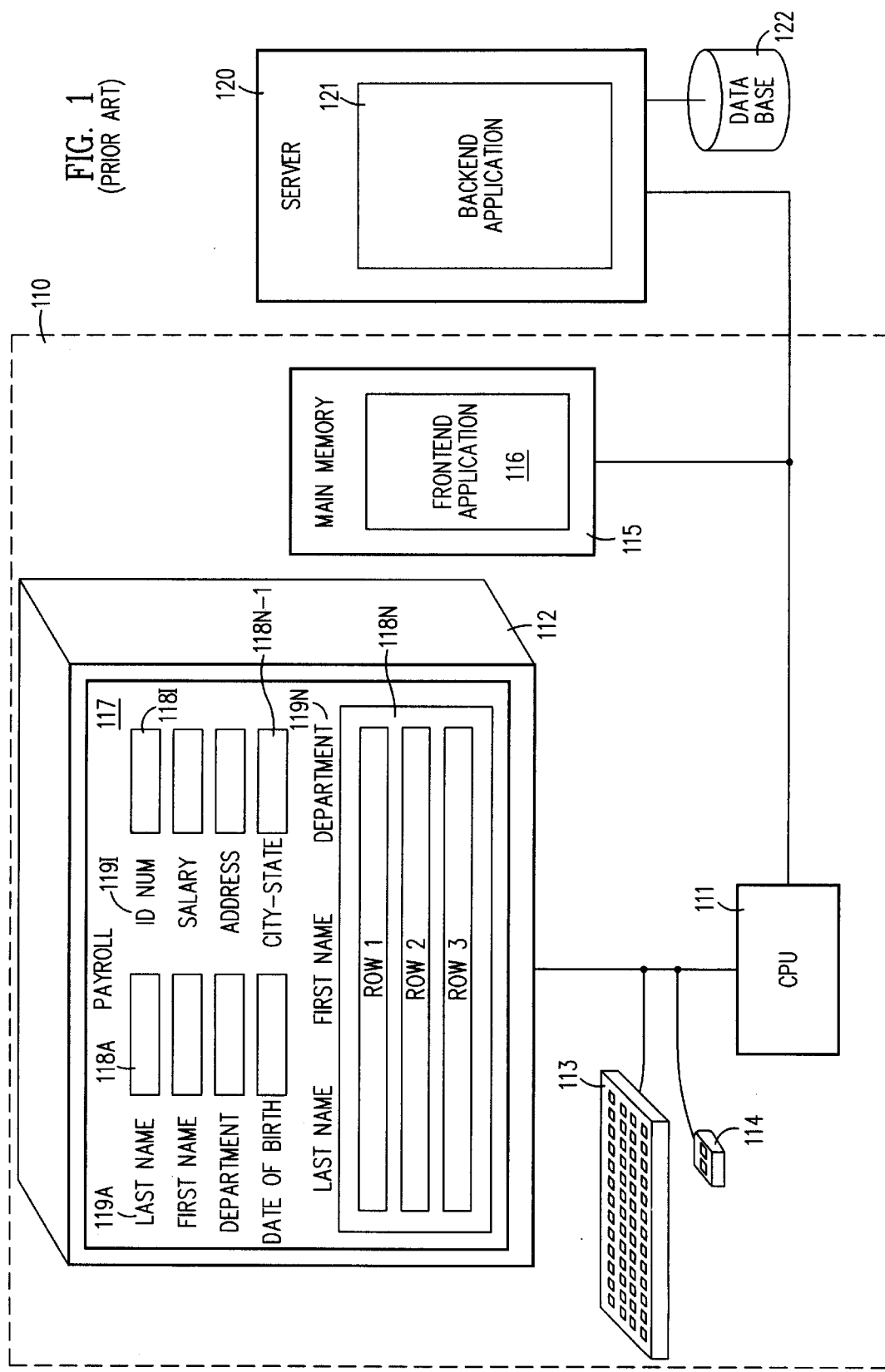
FIG. 1 illustrates a conventional graphical user interface (GUI) computer system.

Next, in step 256 (FIG. 2B) the developer generates source code, e.g., through UIM/X. In this embodiment, the developer stores in a number of field map storage elements 310 (FIG. 3A) a mapping of each of field objects 221A–221F to corresponding memory locations. For example, the developer stores in in subelement 311A of field map storage element 311 (FIG. 3A1) an identification number 1 that is identical to the number 1 that the developer noted in step 253 for field object 221A.

The developer also stores a column name "LAST NAME" and a table name "EMPLOYEE" in subelements 311I and 311J. To sum up, the developer stores the set {1, ... "LAST NAME", "EMPLOYEE" ... } in a field map storage element 311, thereby to identify a set of locations in memory 320 corresponding to field object 221A. In this particular embodiment, each one of storage elements 311–316 uniquely identifies the storage locations for a corresponding one of field objects 221A–221F. In step 257, the developer appends the addresses of storage elements 311–316 to the source code.

Thereafter, the developer also adds, in step 258 (FIG. 2B) a number of instructions, for example, instructions for screen specific functions 422A–422M (FIG. 4) to perform custom operations, e.g. checking a user's privilege, and for database functions 423A–423P to add custom conditions to a database query.

Next, in step 259, the developer compiles the source code to generate an executable application program 420 containing field objects 221A–221N, screen functions 422A–422M, addresses of field map storage elements 311–316, and database functions 423A–423P. In step 260 (FIG. 2B) the developer stores executable application program 420 in a computer's memory 410. Finally, in step 261 (FIG. 2B) the developer changes the state of the computer's central processing unit 401 by executing the executable application program 420 thereby to impart GUI functionality to computer system 400.

Figure 3A:
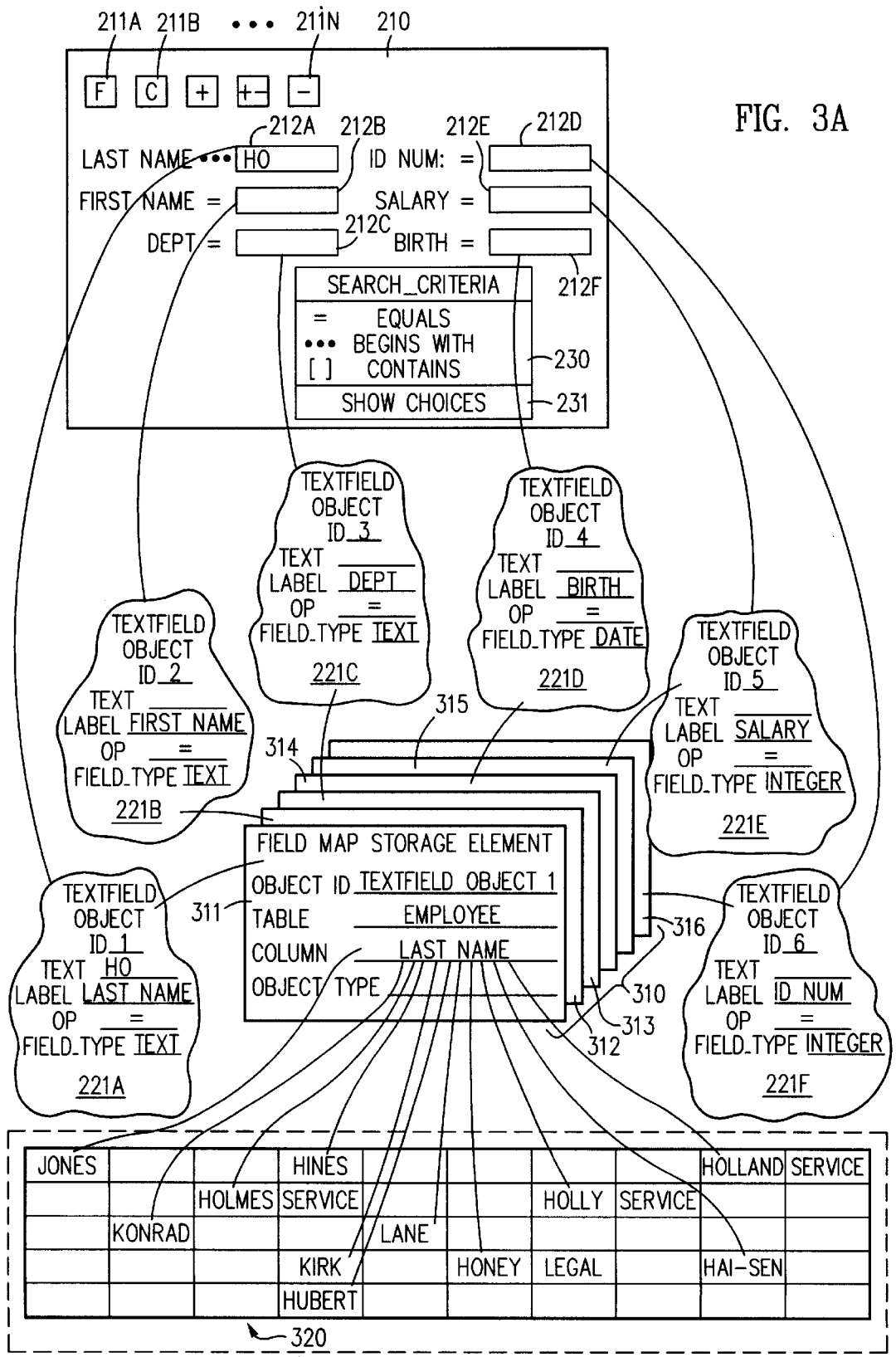
FIGS. 3A–3D illustrate the use of the objects of FIG. 2A and a field map storage element to retrieve and display information from a database to a user in one embodiment of the invention.

During operation, a user can change certain data member storage elements of field objects 221A–221F (FIG. 3A). For example, when the user enters text "HO" in field 212A, the text "HO" is automatically inserted by the application program into data member storage element TEXT of field object 1.

Moreover, a user can change a default operator "=" through a popup menu 230 that is labeled SEARCH_CRITERIA, and that displays a group of operators in dependence on the type stored in data member storage element FIELD_TYPE. For example, popup menu 230 has the operators "EQUALS", "BEGINS WITH", and "CONTAINS" for the type TEXT. Alternatively, a popup menu labeled SEARCH_CRITERIA can have the operator's "<", ">", "=", and "!=" for the type INTEGER, e.g. for "salary" field 212E, and "id num" field 212D. A popup menu 230 can be enabled or disabled from access by a user by calling a function "showmenu." If a popup menu 230 is enabled, the developer can specify an operator, e.g. operator "=" as the default operator, by calling the function "setop."

Referring back to the example illustrated in FIG. 3A, the user chooses the operator "BEGINS WITH", and data member storage element OP in field object 221A is updated automatically. Similarly, when a user types in "SERVICE", into field 212C, the word "SERVICE" is saved in field object 221C.

Figure 3B:
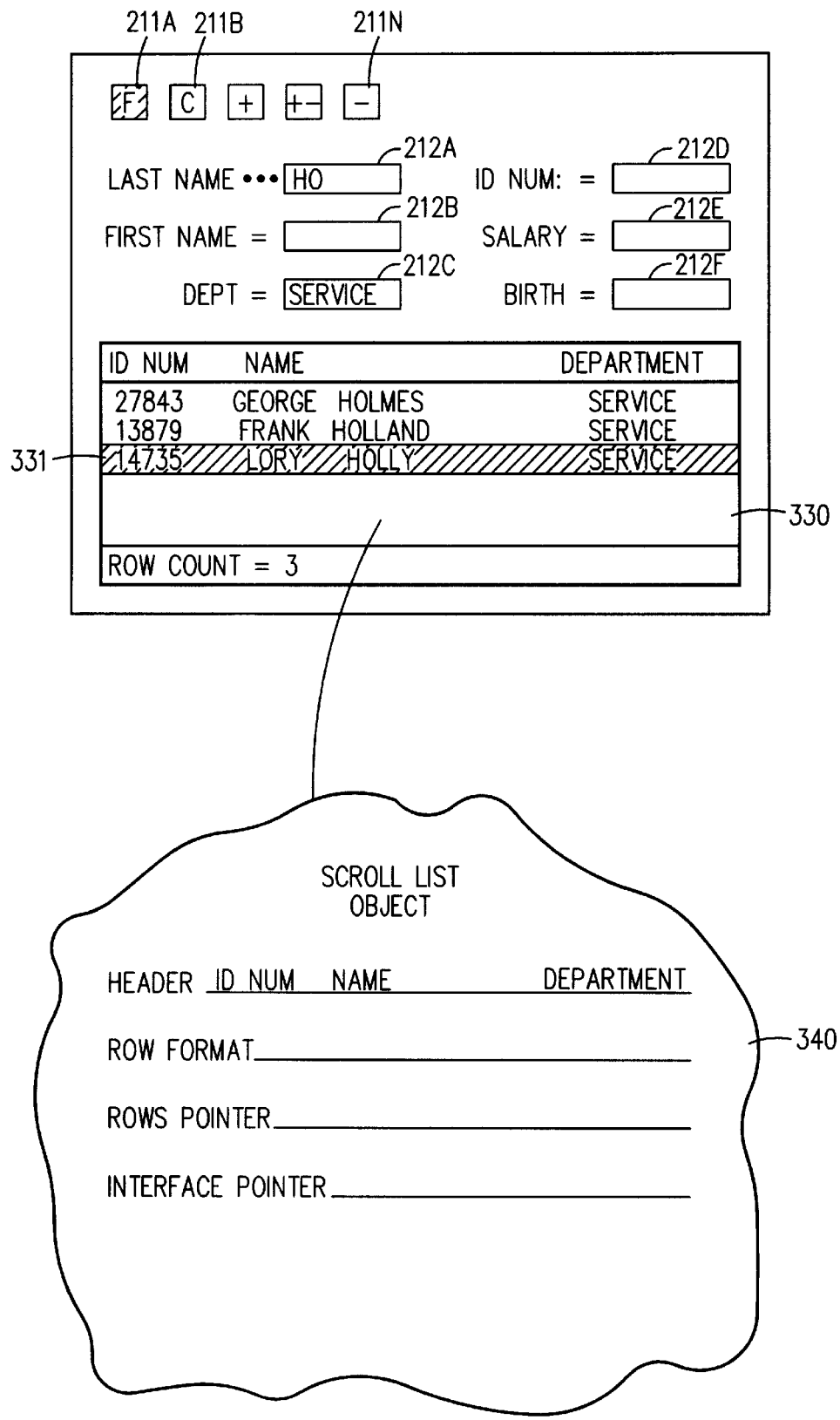
Figure 3C:
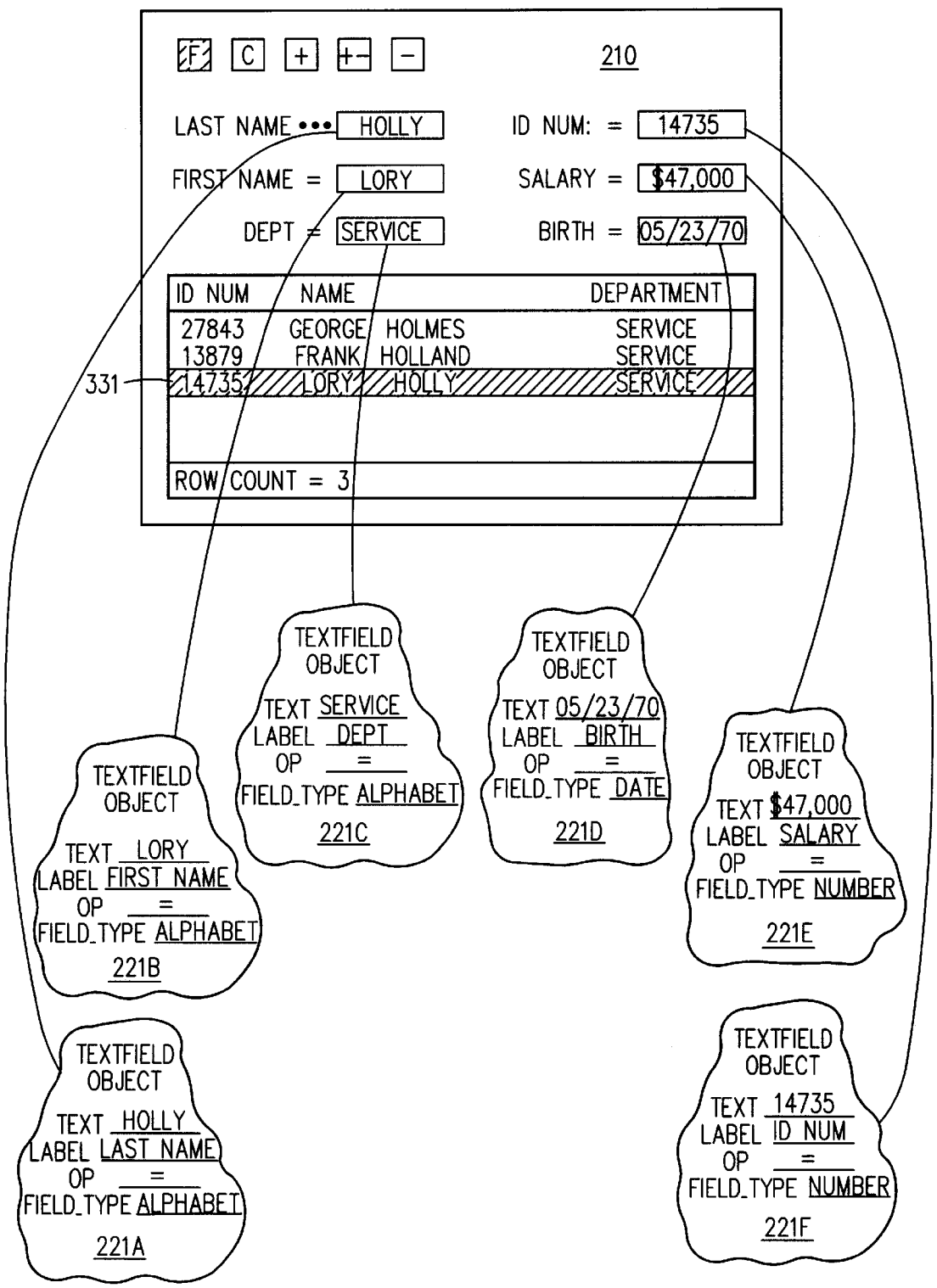

Thereafter, when the user selects the "find" button 211A (FIG. 3B), field map storage elements 311 and 313 (FIG. 3A) are used by the computer process to retrieve from memory 320 the records of employees in the department "SERVICE" having last names beginning with "HO", and a subset of the retrieved information is presented in scroll list 330 (FIG. 3B). Note that although the last name starts with "HO", information on employee with last name "HONEY" is not presented in scroll list 330, because his department is "LEGAL" which does not fit the search criteria of "SERVICE". Thereafter, a user can select a particular row, e.g. row 331 (FIG. 3B), and various other information from memory 320 is retrieved and populated into field objects 221A–221F and thereby into screen 210 (FIG. 3C).

In this embodiment, scroll list 330 contains only a limited length of text in each row, the length being limited by the width of screen 210. Scroll list 330 is associated with a field object 340 (FIG. 3B) that is derived from a predetermined scroll list class 222 (FIG. 2A). Field object 340 has a number of data member storage elements ROW_FORMAT, ROW_POINTER and HEADER. Storage element HEADER identifies the information displayed in each row.

Field object 340 also includes interface pointer storage element INTERFACE_POINTER that identifies various member functions, e.g. functions for retrieving, storing, clearing and deleting from the field object 340 the header information in storage element HEADER and also for each row.

In addition to the above described screen level search involving multiple fields, the computer process can also perform a field level search. Specifically, inclusion of a "search operator" data member storage element OP and a "text" data member storage element TEXT together in a field object, e.g., object 221A (FIG. 3C) allows the computer process to search on a single field, e.g. field 212A, and is hereinafter called "list of values" search. On performing a "list of values" search, a user can view a list of records in the database that match data specified in a particular field.

Figure 3D:
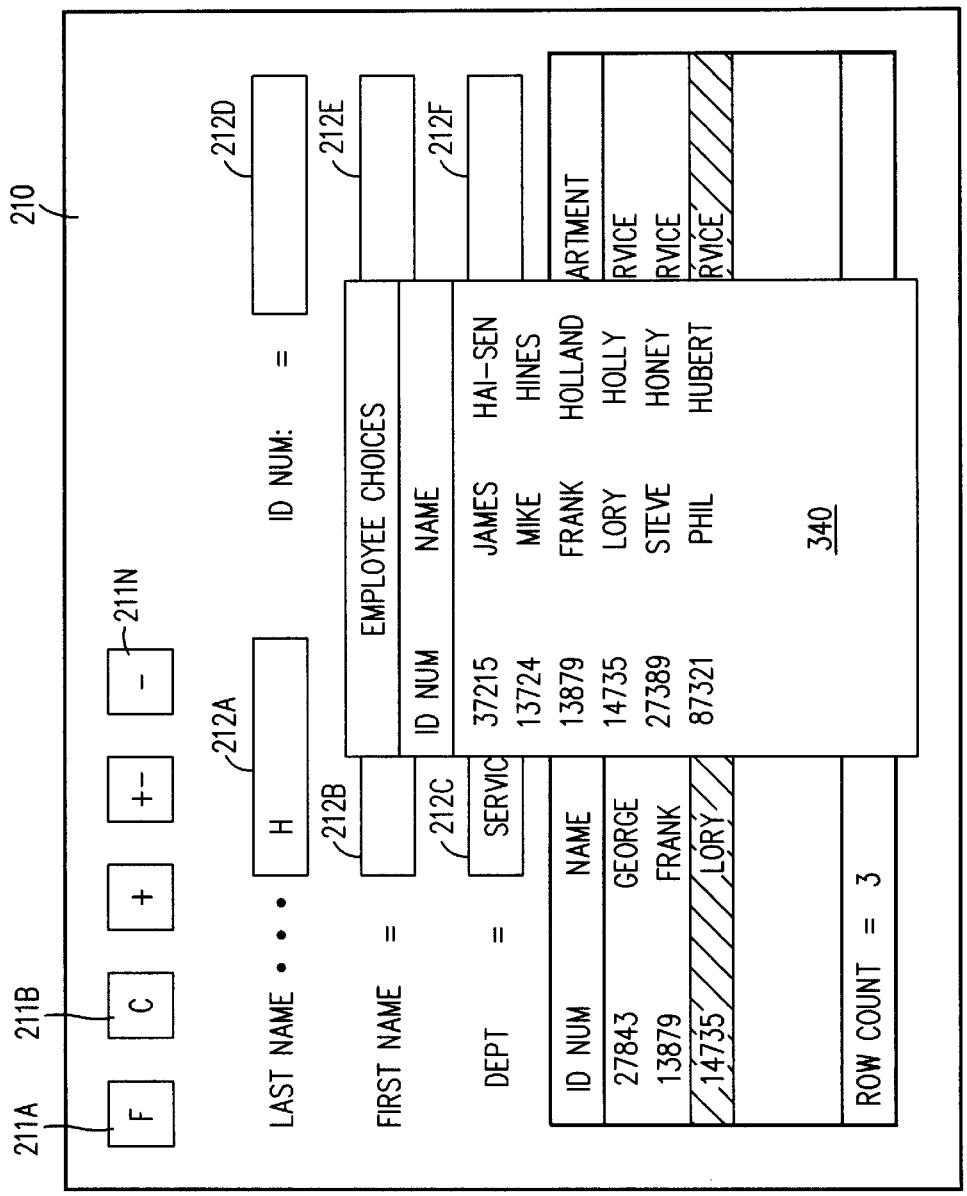

If, for example, an employee record sought by a user is not found in scroll list 330, the user can perform a "field level" search of all employee last names starting with "H" by selecting "SHOW CHOICES" button 230S (FIG. 3A) in popup menu 230. In this example, the computer process fetches from memory 330 information of all employees with last names starting with "H" and displays the retrieved information in a "list of values" screen 340 (FIG. 3D).

Note that in a "field level", search, the computer process searches only on a specific field, e.g., field 212A, and ignores information in other fields, e.g., field 212C. Therefore, the name "HONEY" is shown as one of the employee choices in "list of values" screen 340. The user can select one of the rows in employee choices screen 340 for retrieval and display of information in various fields 212A–212F in screen 220.

In one specific embodiment, a computer system 400 includes a central processing unit (CPU) 401, a monitor 402, a keyboard 403 and a mouse 404. CPU 401 changes state in dependence on execution of instructions of an application program 420 resident in memory 410. Specifically, CPU 401 controls screen 210 displayed on monitor 402 through a video board (not shown) of the type well known to a person of skill in the art of GUI systems. Such a video board is not a critical aspect of the invention.

In accordance with the invention, application program 420 includes a number of field objects 221A, 221B ... 421I ... 221N, where N is the number of field objects in application program 420. In this embodiment, field objects 221A–221N are reusable objects called "components", obtained by using UIM/X as discussed above.

Figure 5:
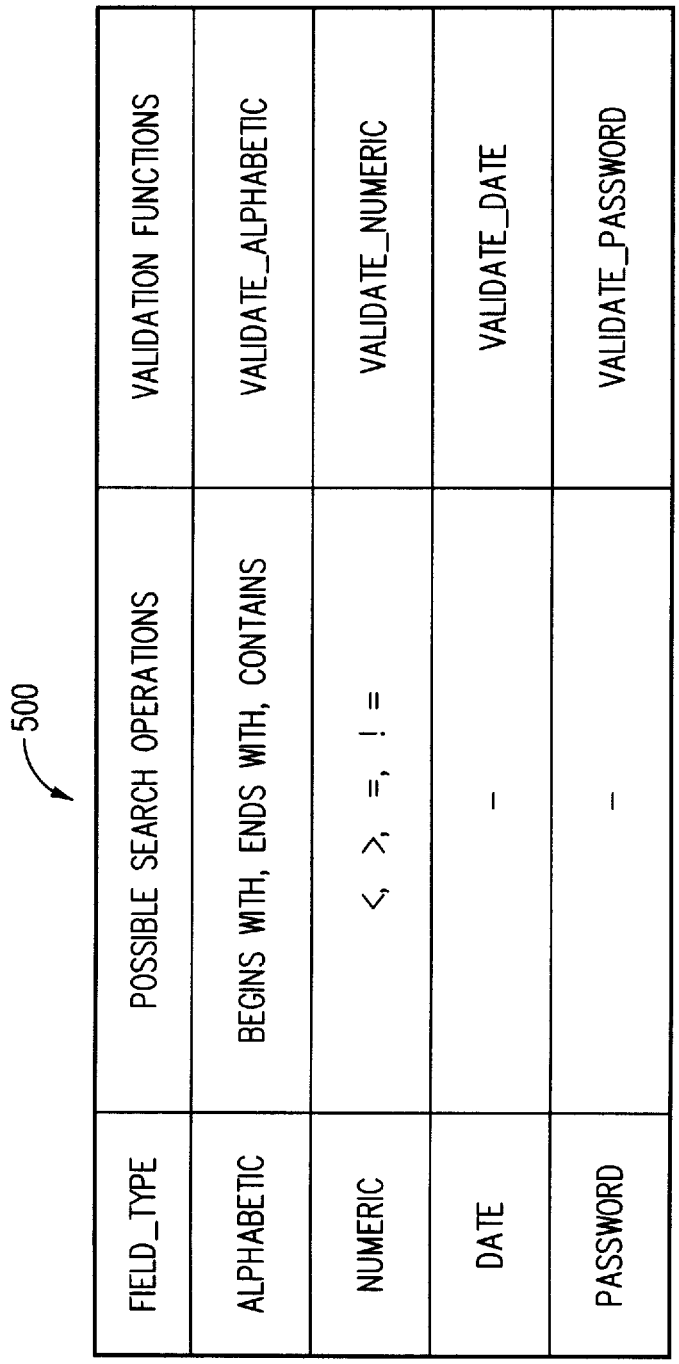
FIG. 5 illustrates an optional table for use with the popup menu of FIG. 3A.

Associated with screen 210 are a number of screen functions 422A–422M, where M is the number of screen functions, that are also included in application program 420. Screen functions 422A–422M are called on occurrence of an event generated by a user, for example by entering data through keyboard 403 for a field 212A and moving a cursor to another field 402N, or by clicking on mouse 404. Screen functions 422A–422M validate the data received from keyboard 403, using an optional "TYPE TABLE" 500, described below in reference to FIG. 5, to validate the signals received from keyboard 103.

Screen functions 422A–422M invoke one or more of database functions 423A–423P, where P is the number of database functions in library 423, to access a database 434 located in a server 430 in this embodiment. Database 434 is formed of, for example, tables 434A–434Q where Q is the number of tables in database 434. Database functions 423A–423P use a set 310 formed of field map storage elements 311–316 to determine one of database columns 434A1–434QZ (FIG. 4) that corresponds to a field object 221I as described more completely below.

Each of field objects 221A–221F includes an interface pointer storage element POINTER that indicates a set of functions for accessing e.g. data member storage elements TEXT, LABEL, OP and FIELD_TYPE. These functions and other similar functions not described herein are obvious to a person of skill in view of the disclosure herein.

Similarly, scroll list object 340 (FIG. 3B) has a number of data member storage elements for holding rows ROW1, ROW2 ... ROWT, where T is the number of rows returned from database 434, and for header HEADER to be displayed with the rows. Scroll list object 340 also has an interface pointer storage element POINTER indicative of functions to add or delete a row ROWI from group 330.

Database functions 423A–423P (FIG. 4) in library 423 create a query to database 434 dynamically (i.e. at run time) by use of set 310. For example, a database function 423A for a list of values search uses a field map storage element 311 identified by a field 212A selected by a user to dynamically build a database query (not shown) in dependence on search operator "begins with" and text "HO" specified in field 212A.

Another database function 423B for a screen level search uses each one of field map storage elements 311–316 in set 310 to build a query (not shown) in dependence on search operators "begins with" and "=" and texts "HO" and "SERVICE" specified in fields 212A and 212C. So, a query for a screen level search is built dynamically and includes a condition for each one of fields 212A–212F in screen 210 if data, e.g. data "HO", is present. Note that database functions 423A–423B also perform various other database operations, e.g. add, delete and update a record specified by the user.

Therefore, a set 310 of field map storage elements 311–316 as described herein allows dynamic queries to be built by GUI application program 420, eliminating the prior art need to have predetermined queries. Holding database information, such as table and column names (e.g. names "EMPLOYEE" and "LAST NAME") for each field 212A–212A of a screen 210 also allows flexibility in changing the database merely by revising the contents of field map storage elements 311–316 and does not require any changes to screen functions 422A–422M or field objects 221A–221N.

Database library 423 also maintains a data structure (not shown), e.g. linked list, to hold the rows ROW1, ROW2 ... (FIG. 1) retrieved from database 434 in response to a query, thereby eliminating the prior art need for a screen function to maintain the storage for retrieved text.

Figure 4:
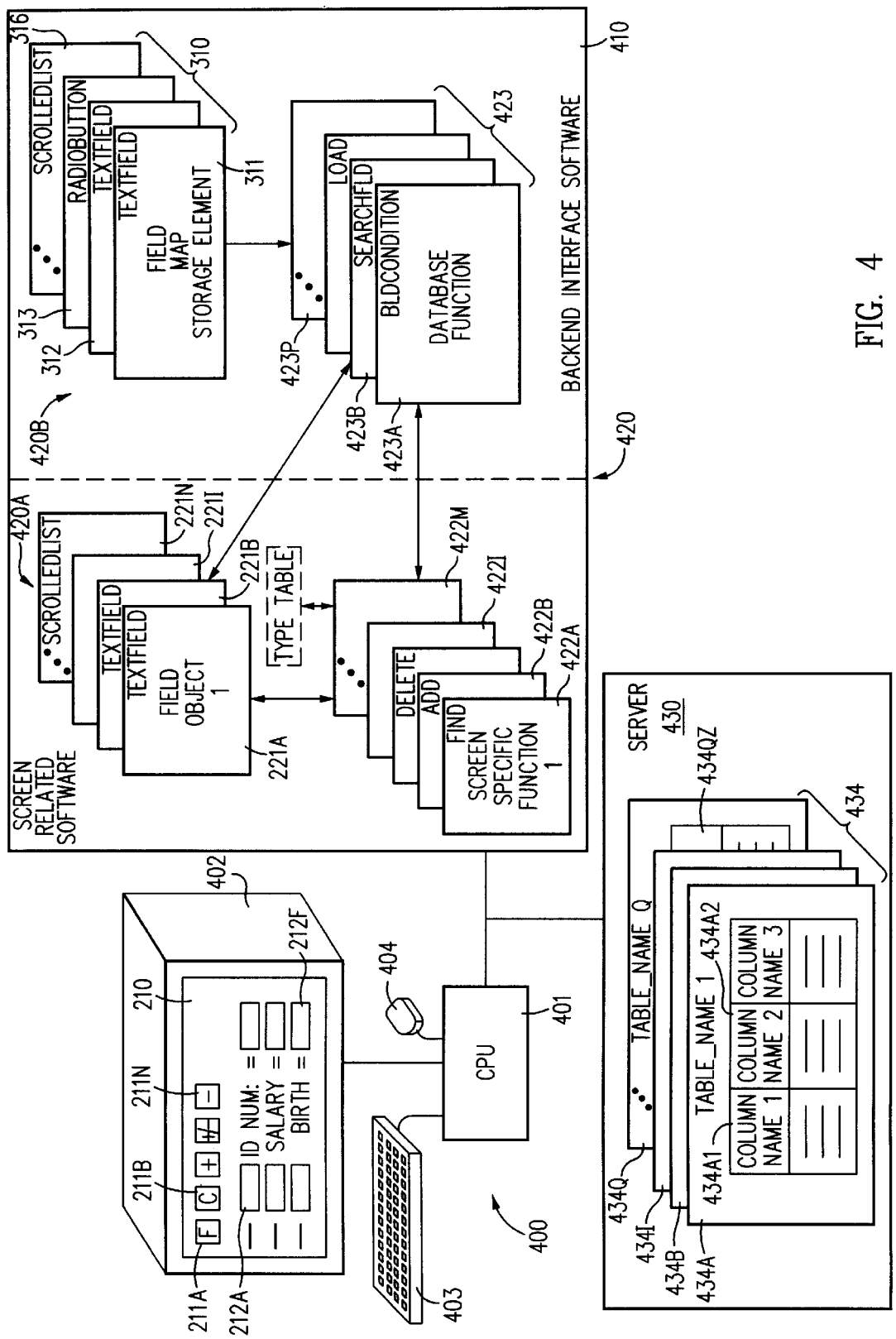
FIG. 4 illustrates, in a high level block diagram, a computer system 400 using a memory 410 with separate screen related software 420A and database related software 420B in accordance with the invention.

Note that in one embodiment, the computer process uses the field type signal FIELD_TYPE to look up in a table 500 (FIG. 5) a validation function, e.g. function validate_alphabetic used to validate a text signal received from keyboard 403 (FIG. 4). Similarly, field type signal FIELD_TYPE can also be used to look up the search operation signals to be displayed in a popup menu 230 (FIG. 3A). Popup menu 230, as described above, is used for selection of an operator that is inserted into storage element OP and used in accessing database 424.

Numerous modifications and adaptations of the above described embodiments will be obvious to the above-described person of skill in view of the disclosure. Many such modifications and adaptations are encompassed by the following claims.

TABLE 1

| Data Member Storage Element | Descriptions |
| --- | --- |
| UxParent | The parent id for the created field object given by UIM/X |
| label | Description of the information to be stored in the created field object |
| labelwidth | Number of characters in the label |
| maxchars | maximum number of characters allowed in label |
| fieldtype | Different field type generates different set search operators on the popup menu. The value can be any one of the following:<br>#define TEXT 0<br>#define INTEGER 1<br>#define FLOAT 2<br>#define PASSWD 3<br>#define DATE 4 |
| *lov_query | Pointer to a Query for a list of values (LOV) search |
| *lov_format | Pointer to a format for display of LOV result rows |
| *lov_header | Pointer to a LOV header |
| *lov_field1 | Id of the LOV request and field to be populated |
| *lov_field2 | Id of the field to be populated |
| *lov_field3 | Id of the field to be populated |
| *lov_field4 | Id of the field to be populated |
| *lov_field5 | Id of the field to be populated |
| *join_condition | Pointer to a Join condition for identifying other tables to be accessed, e.g. to populate other fields (described above). |

TABLE 2

| Member Functions | Descriptions |
| --- | --- |
| getlabel | Get the label string. |
| getint | Get intergervalue of the user input in the fired. |
| getfloat | Get floating point value of the field. |
| clrfld | Clear the text in the field |
| editable | Set the text in the field as editable (1), or non-editable (0). |
| getstring | Get the text's value from user's input in the field. |
| pustring | Put text value into (i.e. populate) the field |
| putint | Put integer value into (i.e. populate) the field |
| putfloat | Put floating value into (i.e. populate) the field |
| showmenu | Disable/Enable user's access of the popup menu from the field, where 0-disable; 1-enable |
| disableop | Disable user's access to an operator in the popup menu. |
| getop | Get user selected search operator (default operator is "=") |
| setop | Set default operator ("=") |
| setlabel | Update label for the field; allows the field objects to be changed depending on various conditions |

We claim:

1. A method of developing a graphical user interface (GUI) for accessing a database in a computer by use of a GUI builder with access to a plurality of predetermined classes, the method comprising:

obtaining a screen having a plurality of command items in the screen;

selecting a first predetermined class from the plurality of predetermined classes, the first predetermined class defining a first storage element for holding information, a second storage element for holding a label for labeling a display of the information, and a third storage element for holding a database operator;

instantiating the first predetermined class to form a first field object;

storing in the first field object, information including a label, the first field object's information being devoid of database related information;

assigning a screen specific function to the screen;

generating source code through the GUI builder, the source code comprising the screen, the first field object and the screen specific function, the source code being independent of database related information;

appending to the source code an address of a field map storage element, the field map storage element defining an association between a column in a table of a database and an identification number indicative of the first field object;

customizing a database function in the source code by adding a custom condition to a database query;

compiling the source code to generate an executable computer application program comprising the screen, the first field object, the screen specific function and the database function;

storing the executable computer application program in a computer's memory; and changing the state of the computer's central processing unit by executing the executable application program thereby to impart GUI functionality to the computer.

2. The method of claim 1 further comprising the step of disabling a popup menu.

3. The method of claim 1 further comprising the step of setting a default search operator.

* * * * *